United States Patent Office
2,973,234
Patented Feb. 28, 1961

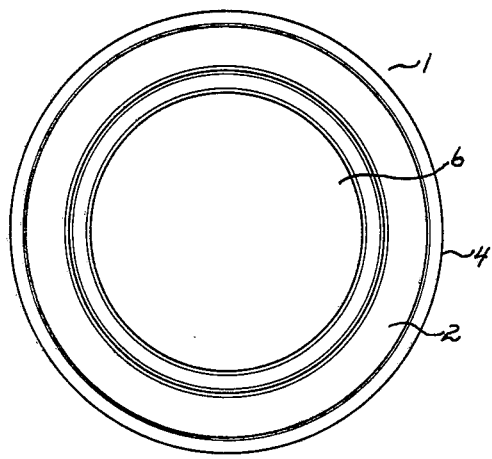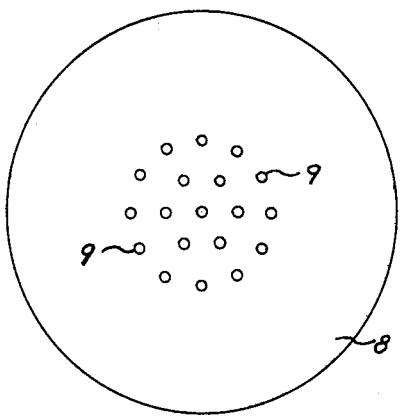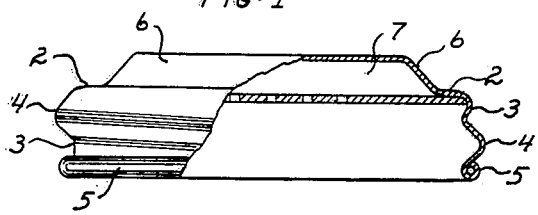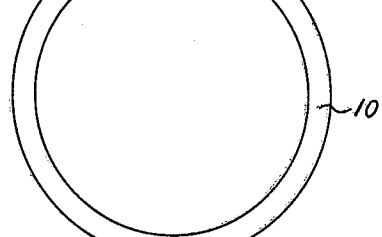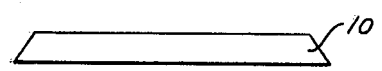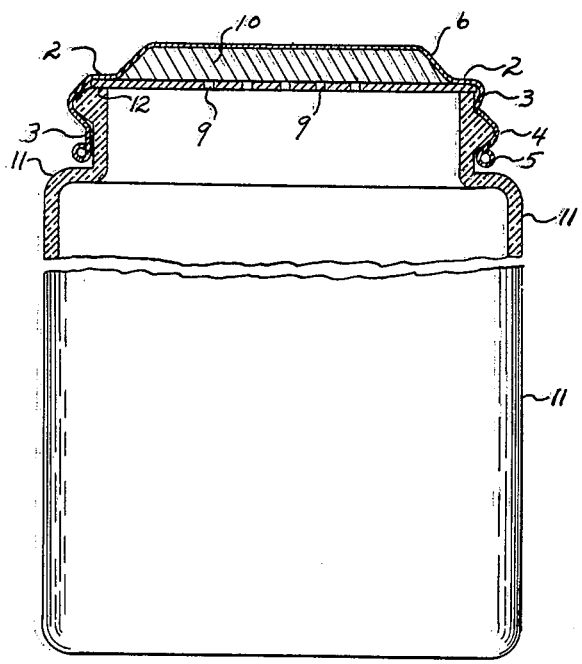

2,973,234

CLOSURE AND PACKAGE CLOSED THEREWITH

Ernest H. Tessmer, Arlington Heights, and Edward T. Wilhelm, Parkridge, Ill., assignors to The Glidden Company, Cleveland, Ohio, a corporation of Ohio Original application May 12, 1955, Ser. No. 507,829, now Patent No. 2,915,404, dated Dec. 1, 1959. Divided and this application Mar. 14, 1958, Ser. No. 721,507

3 Claims. (Cl. 312—31.1)

This invention relates to a novel cap or closure particularly adapted for use with materials generating undesirable odors while stored in wide-mouth bottles or jars. More particularly, the invention relates to a closure or cap of the replaceable type whose structure permits odor-adsorbing material in solid form to be disposed and retained therein in odor-adsorbing relation to the contents of the jar.

This application is a division of our copending application Serial No. 507,829 filed May 12, 1955, now Patent No. 2,915,404, issued December 1, 1959.

Various materials packaged in glass or other containers tend to generate undesirable odors while being stored. The problem of dissipating such odors is especially acute with edible products such as lecithin granules, mayonnaise, salad oil, etc. where the palatability of the products is apt to be judged by the odor as well as the flavor.

We have now originated a closure for conventional containers which has a structure permitting effective amounts of solid odor-adsorbing material to be disposed in the closure and retained there by a liner. To facilitate the access of odors in the container to the odor-adsorbing material, the liner is perforated and the odor-adsorbing material is controlled as to particle size so that none of it will fall through the perforations. Thus our structure provides a unitary closure which retains the odor-adsorbing material in the head space of the container in effective odor-adsorbing relationship to the contents, while yet making it easy for the container to be opened and closed as often as necessary without danger of the odor-adsorbing material falling into the contents.

Accordingly, one object of our invention is to provide a closure structure providing space in which to place odor-adsorbing materials.

A further object is to provide a closure and liner assembly adapted to retain solid odor-adsorbing material in a space provided for that purpose.

A further object is to provide a container carrying odor-generating material, closed with a closure-and-liner assembly carrying odor-adsorbing material disposed therein in a space provided for that purpose.

These and other objects will be understood more fully from the following description of our invention taken in conjunction with the attached drawings, in which:

Fig. I is a plan view of a closure embodying the principles of our invention.

Fig. II is a plan view of a perforated liner for the closure of Fig. I.

Fig. III is an elevational view of the closure of Fig. I and liner of Fig. II assembled together in the cooperating disposition of the invention, portions of the view having been broken away to more clearly reveal internal features.

Fig. IV is a plan view of a preformed disc of activated carbon adapted for disposition in the head space of the closure-liner assembly of Fig. III.

Fig. V is an elevational view of the disc of Fig. IV.

Fig. VI is an elevational view, partly in section, of a glass jar on which is screwed a cap-liner-adsorbent assembly composed of the members shown in Figs. I–V, inclusive.

Referring now to Figs. I and III, which illustrate a threaded metal cap 1 adapted for use in removably closing a glass jar, it will be seen that the cap has a flat, annular shoulder portion 2 from which depends a short threaded generally tubular skirt 3 provided with helical thread-engaging grooves 4, 4 formed integrally therein, as by rolling or die-pressing. The skirt 3 terminates in a reinforcing rolled edge or bead 5, as is conventional in threaded metal caps. Rising above the plane of the shoulder 2 is an inverted cup or crown formed from the metal of the cap by a drawing operation so as to provide a continuous unbroken shell of metal 6 enclosing a head space 7 in which one or more pieces of solid odor-adsorbing material can be disposed, e.g., a material such as activated carbon.

Referring now to Fig. II, which illustrates a liner for the cap of Figs. I and III, it will be apparent that the liner is a thin disc 8 of suitably rigid, resilient material, such as cardboard, plastic, metal, or otherwise, having a diameter dimensioned to enable it to be placed in cap 1 so as to rest against the annular shoulder 2, and yet be removably held in place there within the skirt 3 by small frictional forces set up between the skirt and the periphery of the disc. Apertures 9, 9 are provided in the central portion of the disc 8 so as to permit odors to pass through them into the head space 7 of the cap, when the disc is in its proper position against the annular shoulder 2 of the cap, as shown in Fig. III.

Shown in Figs. IV and V is a preformed disc 10 of activated carbon dimensioned to fit snugly in the head space 7 of the cap of Fig. III. It will be understood that this disc is disposed in the cup of crown 6 of the cap, then the liner 8 is inserted and pressed or snapped into position against the shoulder 2 of the cap. The three pieces then form a unitary structure which can be handled like the conventional threaded cap in that it can be unscrewed from a jar, contents can be removed from the latter in any desired amount, and the cap can be screwed back on the jar to close it.

This unitary assembly is illustrated in Fig. IV, where the cap assembly is shown in closed position on the mouth of a glass jar 11. It will there be observed that the lip 12 of the jar presses tightly against the liner 8 and shoulder 2 when the cap is screwed down tight. This seals the jar and keeps the outside atmosphere from gaining access to the activated carbon disc 10. This sealing action assists in prolonging the activity of the activated carbon and in having substantially only the odors of the contents of the jar adsorbed thereby. It will be understood that by preference, the liner 8 is composed of or provided with a layer of resilient or yieldable material which assists in forming an effective seal between the shoulder 2 and the lip 12 of the jar. Cardboard or plastic-faced cardboard has such resiliency and various types of other materials are conventionally used in the construction of liners. The material of which the liner is composed forms no part of the present invention and needs no extended discussion since any conventional sheet-like liner material(s) adapted for use with the material which is to be packaged in the jar can be used in making our perforated liner 8.

The foregoing description of the invention in terms of Figs. I–IV should be regarded as merely illustrating one particular embodiment of the invention. Various obvious changes can be made therein without departing from the principles of the invention. Thus, the cap 1 can be made of plastic or other appropriate material instead of metal. The head space 7 of the cap can be given a variety of different configurations and volumes. The cap can be a friction cap of conventional structure modified to include a desired head space, instead of being a modified screw cap. The odor-adsorbing material, instead of being activated carbon, can be one or more of any of the conventional odor-adsorbing materials, and that material need not be in the form of a preformed disc as shown in 10. Pellets, pastilles, tablets, or irregular chunks or grains of material can be used instead. The material should, of course, be of a size larger than will pass through the perforations 9, 9 in the liner. We prefer a preformed disc, however, of a material which can be hardened in place after having been applied in a plastic state, since such bodies can be made to fit snugly in the head space 7 of the cap and hence will not slide around as loose grains or pellets would, the latter thereby tending to form particles of powder which could drop through the perforations 9, 9 of the liner into the contents of the container.

Activated carbon is our preferred odor-adsorbing material when the odor of lecithin is to be adsorbed. Lecithin currently being packaged in a dry granular form for consumption as a dietary supplement tends to retain small amounts of acetone used in its preparation. The resulting odor of acetone can be effectively suppressed by packing the lecithin in a container closed with our closures and having activated carbon as the adsorbent therein. Other odors derived from the lecithin can also be effectively adsorbed in the activated carbon. Consequently, when lecithin is pakaged in accordance with the principles of our present invention, it reaches the consumer in a pleasantly palatable form, free of the undesirable odors heretofore encountered. As indicated above, however, the principles of our invention can be used equally effectively with various other materials, especially edible materials which are in a solid or plastic state like mayonnaise or salad dressing. Edible liquids like salad oil can also be benefited by packaging in accordance with the invention, but but it will be noted in such case, the oil can get into contact with the odor-adsorbent material unless special care is exercised in handling the individual containers or in handling cartons of the individual containers. Such contact is neither harmful nor objectionable ordinarily, but it may offend the esthetic principles of some consumers. Activated carbon is frequently used, for example, in the commercial processing of oils to improve their color. Consumers who are unaware of this fact might find some objection to the same situation when they can see that in their particular package of oil, contact does occur between that oil and a black material (whose composition is unknown to them) disposed in the cap of that package.

The amount of adsorbent needed to adsorb the odors of a given quantity of material varies, of course, with the amount of volatile, odoriferous material present, the adsorbing capacity of the adsorbent material, and with the frequency with which the adsorbing capacity of the adsorbent material is dissipated by exposing it to transient and extraneous odoriferous and adsorbable material other than that due to the given material, as by leaving the cap exposed to the ambient atmosphere frequently and for periods of time longer than necessary to remove material from the container. We have found that when the material is granular lecithin of the quality currently being marketed as a dietary supplement, 3.5 grams of activated carbon pellets corresponding in adsorbing capacity to the commercial product of Carbide and Carbon Company and known in the trade by the name or designation "Type AC" will keep eight ounces of the granular lecithin pleasantly odor-free for the period of time normally involved in consuming the eight ounces of lecithin; namely, about one month after the average consumer has first opened the jar.

Having now described our invention, what we claim is:

1. In a closure for a container, a cup-shaped body adapted to be releasably applied to a container mouth to close the same, the side wall of said body being equipped with an inwardly-extending planar shoulder intermediate the height of said side wall, the side and top walls of said body upward of said shoulder providing a disc-shaped head space, a unitary disc of odor-adsorbent material substantially filling said head space, and an apertured resilient liner extending across said body to close said head space and frictionally held in place by the engagement of the liner periphery of the body side wall below said shoulder, and inwardly-extending integral projection means in said side wall below said shoulder and spaced from said disc for tightening said body on a container whereby the liner is compressed against the shoulder to provide a gasket-type seal and simultaneously substantially immobilize said disc.

2. In a closure for a container, a cup-shaped body adapted to be releasably applied to a container mouth to close the same, the side wall of said body being equipped with an inwardly-extending planar shoulder intermediate the height of said side wall, the side and top walls of said body upward of said shoulder providing a disc-shaped head space, a unitary disc of adsorbent carbon material substantially filling said head space, an apertured resilient liner extending across said body to close said head space and frictionally held in place by the engagement of the liner periphery with the body side wall below said shoulder, and means in said side wall below said shoulder for tightening said body on a container.

3. In a closure for a container, a cup-shaped body adapted to be releasably applied to a container mouth to close the same, the side wall of said body being equipped with an inwardly-extending planar shoulder intermediate the height of said side wall, the side and top walls of said body upward of said shoulder providing a disc-shaped head space, a unitary disc of odor-adsorbent material substantially filling said head space, an apertured resilient liner extending across said body to close said head space and frictionally held in place by the engagement of the liner periphery with the body side wall below said shoulder, and thread means in said side wall below said shoulder for tightening said body on a container, whereby the liner is compressed against said shoulder to provide a gasket-type seal and simultaneously substantially immobilize said disc.

References Cited in the file of this patent

UNITED STATES PATENTS

| | | |
|---|---|---|
| 822,235 | Bailey | June 5, 1906 |
| 1,794,940 | Zimmermann | Mar. 3, 1931 |
| 2,317,882 | Boesel | Apr. 27, 1943 |
| 2,514,902 | Sabath | July 11, 1950 |
| 2,594,729 | Carvalho | Apr. 29, 1952 |
| 2,676,078 | Young | Apr. 20, 1954 |